United States Patent [19]
Rupp, II

[11] Patent Number: 5,738,035
[45] Date of Patent: Apr. 14, 1998

[54] OUTRIGGER SYSTEMS FOR MOTORBOATS

[75] Inventor: Herbert E. Rupp, II, Port Salerno, Fla.

[73] Assignee: Rupp Marine Inc., Port Salerno, Fla.

[21] Appl. No.: 756,611

[22] Filed: Nov. 26, 1996

[51] Int. Cl.$^6$ ...................................................... B63B 35/14
[52] U.S. Cl. ........................... 114/255; 43/21.2; 114/343; 248/514; 403/104
[58] Field of Search ..................... 114/255, 343, 114/361; 43/21.2; 212/292; 403/83, 104; 248/514, 521, 532, 534, 535, 538, 539

[56] References Cited

U.S. PATENT DOCUMENTS

| | | | |
|---|---|---|---|
| 2,927,754 | 3/1960 | Davis | 248/514 |
| 3,161,390 | 12/1964 | Larson | 248/514 |
| 3,190,594 | 6/1965 | Chion | 248/514 |
| 3,212,740 | 10/1965 | Greenberg | 403/96 |
| 4,993,346 | 2/1991 | Rupp | 114/255 |
| 5,592,893 | 1/1997 | Jordan III et al. | 114/364 |

*Primary Examiner*—Sherman Basinger
*Attorney, Agent, or Firm*—Carroll F. Palmer

[57] ABSTRACT

An improved locking unit is disclosed for outrigger devices that are installed on a T-top equipped motorboat that has an outrigger pole supported by its bottom end portion above the T-top and which permits the outrigger pole to be moved by rotation of the lower end portion from a stowage position to a trolling position and vis versa by a person safely standing in the motorboat in the shelter of the T-top by manipulation of locking unit. Such locking unit includes (a) a tubular member, (b) a cylindrical collar fixed to the tubular member, (c) an indexing ring carried on the collar and having a plurality of side opening cavities, (d) a compression feature on the indexing ring selectively to prevent or permit such ring's rotation on the collar, (e) a rotation ring carrying a locking lever and (f) an arcuate tube that supports the bottom end of the outrigger pole is rotatably carried in the tubular member and is pinned to the rotation ring. To reposition the outrigger pole, the locking lever is moved out of one cavity, moved circumferentially and then reinserted into a different cavity.

5 Claims, 2 Drawing Sheets

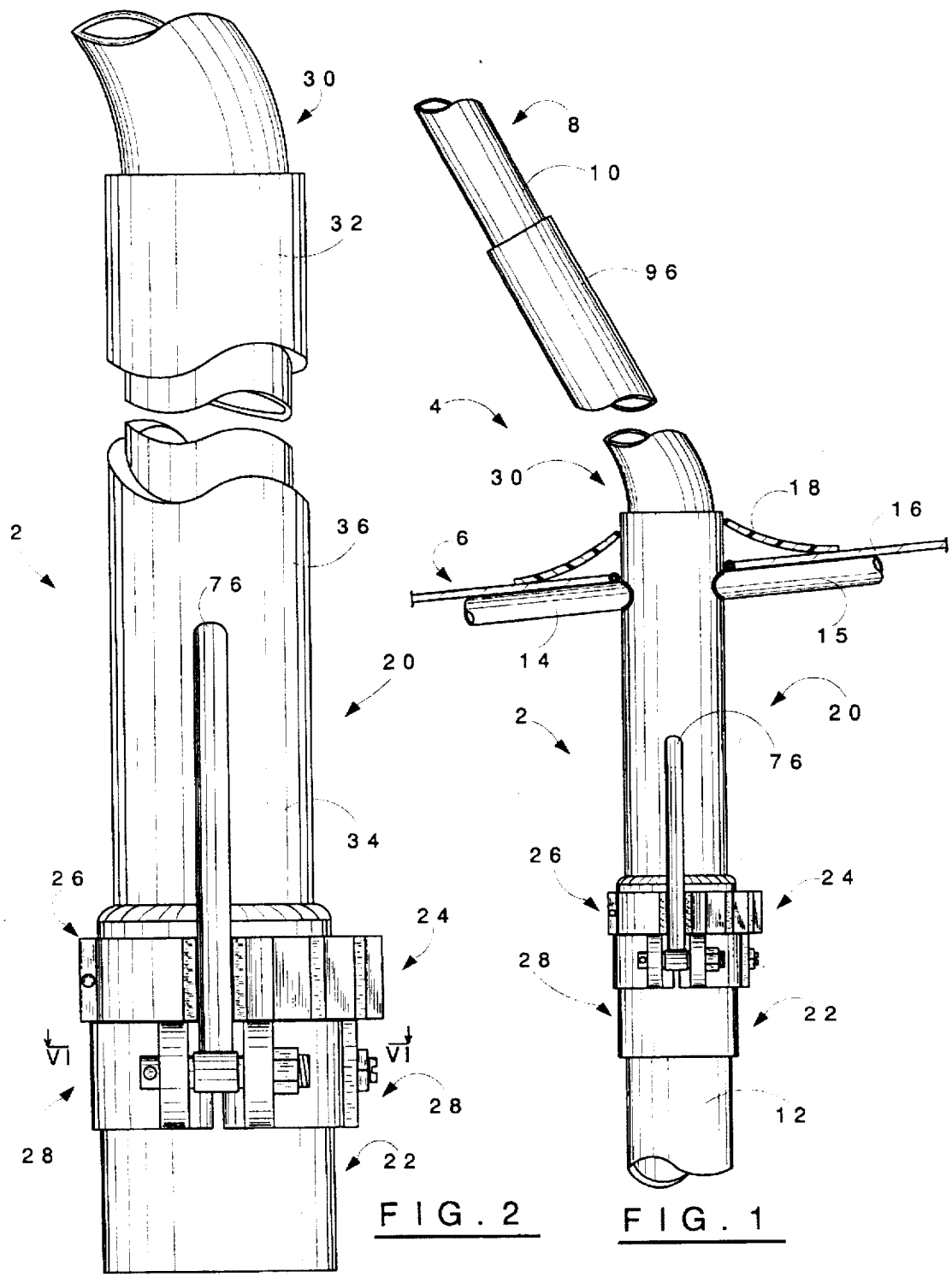

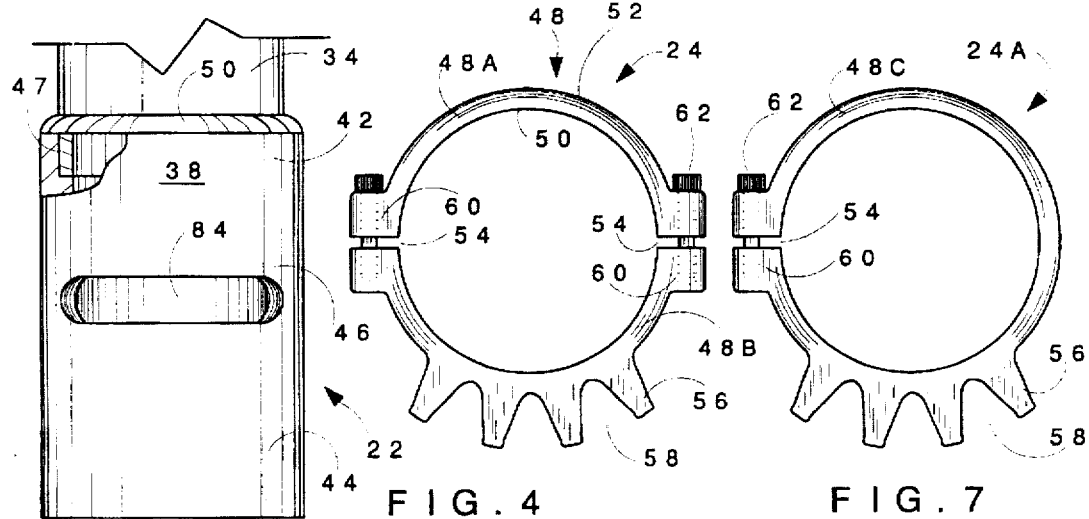
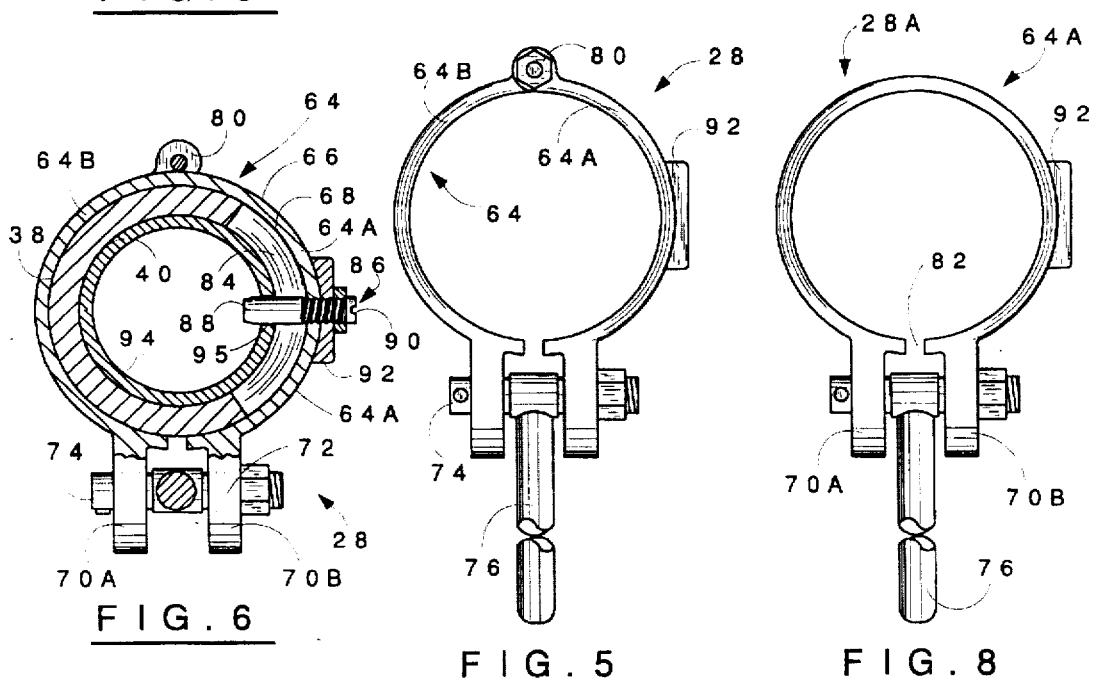

OUTRIGGER SYSTEMS FOR MOTORBOATS

BACKGROUND OF THE INVENTION

1. Field of the Invention

This application relates to outrigger systems for use with motorboats, especially center console type motorboats fitted with so-called T-tops.

2. Description of the Prior Art

The assignee of this present invention is the owner of U.S. Pat. No. 4,993,346, which is incorporated herein by reference.

That patent concerns a new type of outrigger device for use on T-top equipped motorboats which permits the outriggers thereon installed over the T-top to be moved from a stowage position to a trolling position and vis versa by an occupant of the boat standing in the shelter of the T-top. Such improved outriggers eliminated the need of some person aboard the boat to reach over the T-top to move the outrigger which was the unsafe procedure typically required for outrigger positioning before the invention covered by that patent. The important safety advantage of the improved T-top outriggers was quickly recognized by sport fishermen creating a ready market for the patented outrigger systems and prompting other boat hardware suppliers to produce and sell outrigger systems that mimic this new T-top boat type.

The present invention makes further improvements in the improved type outrigger systems of the invention covered in U.S. Pat. No. 4,993,346.

OBJECTS

A principal object of the invention is the provision of further improvements in the type of outrigger systems for motorboats provided by the invention disclosed in U.S. Pat. No. 4,993,346.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of an improved locking means for outrigger devices that are installed on a T-top equipped motorboat that has an outrigger pole supported by its bottom end portion above the T-top and which permits the outrigger pole to be moved by rotation of the lower end portion from a stowage position to a trolling position and vis versa by a person safely standing in the motorboat in the shelter of the T-top by manipulation of locking means.

The new locking means of the invention comprises in combination (a) a tubular member, (b) a cylindrical collar, (c) indexing means, (d) compression means, (e) rotation means and (f) an arcuate tube rotatably carried in the tubular member.

The tubular member that extends through the T-top is defined by a longitudinal axis, an upper end portion and a lower end portion joined integrally to a central portion with the upper end portion positioned above the T-top and the lower end portion positioned below the T-top.

The cylindrical collar is axially aligned with the tubular member and is defined by an outside surface, an inside surface, an upper end, a lower end and an integral central portion. The collar is fixed to the lower end portion of the tubular member.

The indexing means comprises a ring-like piece having an inner arcuate surface, an outer arcuate surface and at least one split portion therein. It further includes a plurality of lugs that project laterally from the outer arcuate surface with the lugs defining a plurality of lateral opening cavities.

In a preferred embodiment, the ring-like piece of the indexing means is split into two parts, each of which has end flanges through which machine screws extend to clamp the two parts together. In another embodiment, the ring-like piece of the indexing means has a single split therein and each of the opposing ends of the ring-like piece has end flanges through which a machine screw extends to clamp the the opposing ends together.

The compression means clamps the indexing means in fixed position upon the the central portion of the cylindrical collar and also releases the indexing means for repositioning circumferentially relative to the cylindrical collar.

The rotation means is in the form of a ring defined by an external surface and an internal surface rotatably carried upon the central portion of the cylindrical collar. A pair of opposed flanges project laterally from the external surface and there are alinged bores in the flanges which carry a pin and a locking lever is rotatably carried at one end upon the pin permitting the locking lever to be moved into a vertical position to enter the lateral opening cavities or a horizontal position clearing the cavities.

In a preferred embodiment, the ring of the rotation means is bifurcated and the resulting two part are hinged together by hinge means located diametrically opposed to the pair of opposed flanges. In another embodiment, the ring of the rotation means is split between the pair of opposed flanges.

A horizontal slot extends through the cylindrical collar from the outside surface to the inside surface which has a length substantiall less than the circumference of the cylindrical collar. A rotation pin having an internal end and an external end by which the pin is carried by the rotation means extends horizontally through the horizontal slot inwardly of the cylindrical collar.

An arcuate tube defined by a bottom portion is axially alinged with the longitudinal axis and rotatably carried in the tubular member. A top portion of such tube extends beyond the upper end portion and at an angle relative to the longitudinal axis of the tubular member. Also, the bottom portion contains a lateral hole through which the internal end of the rotation pin extends.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein:

FIG. 1 is a fragmentary, partially sectionaled, lateral view of a T-top motorboat outrigger system constructed in accorance with the invention.

FIG. 2 is an enlarged fragmentary view of the outrigger system shown in FIG. 1.

FIG. 3 is a fragmentary lateral view of one component of the outrigger system shown in FIG. 1.

FIG. 4 is a plan view of a second component of the outrigger system shown in FIG. 1.

3

FIG. 5 is a plan view of a third component of the outrigger system shown in FIG. 1.

FIG. 6 is a sectional view taken on the line VI—VI of FIG. 2.

FIG. 7 is a plan view of another embodiment of the second component shown in FIG. 4.

FIG. 8 is a plan view of another embodiment of the third component shown in FIG. 5.

DESCRIPTION OF THE PREFERRED EMBODIMENTS

With reference in detail to the drawings, the improved locking means 2 of the invention is for outrigger devices 4 that are installed on a T-top 6 of a motorboat (not shown) that has an outrigger pole 8 supported by its bottom end portion 10 above the T-top 6 by which the outrigger pole is moved by rotation of the lower end portion 10 between trolling and stowage positions.

So the load of the outrigger device 4 will not need to be carried solely by the T-top 6, the locking means 2 has depending therefrom a tubular standard 12 that extends to the cockpit sole (not shown) of the motorboat. The T-top installation typically also includes support struts 14 & 15, fabric 16, flexible closure 18 and other components known to the art.

The locking means 2 comprises a tubular member 20, a cylindrical collar 22, indexing means 24, compression means 26, rotation means 28 and an arcuate tube 30 rotatably carried in the tubular member 20.

The tubular member 20 extends through the T-top and has an upper end portion 32, a lower end portion 34 and a central portion 36.

The cylindrical collar 22 is defined by an outside surface 38, an inside surface 40, an upper end 42, a lower end 44 and an integral central portion 46. The collar 22 is axially aligned with and fixed to the lower end portion 34 of tubular member 20 by the butt joint 48 and weldment 50.

The preferred embodiment of indexing means 24 comprises a ring-like piece 48 having an inner arcuate surface 50, an outer arcuate surface 52 and is divided into two parts 48A & 48B by a pair of splits 54. Part 48B includes a plurality of lugs 56 that project laterally from the outer arcuate surface 52 defining a plurality of lateral opening cavities 58. FIG. 4 shows the indexing means 24 with three cavities 58, but more or less may be used, e.g., 2, 4, 5, etc.

The compression means 26 for piece 48 comprise end flanges 60 on each part 48A & 48B through which machine screws 62 extend to clamp the two parts 48A & 48B together to fix the indexing means 40 in a selected position upon the central portion 46 of the cylindrical collar 22. Screws 62 also release the indexing means 24 for repositioning it circumferentially relative to the cylindrical collar 22.

In the second embodiment of indexing means 24A, the ring-like piece 48C has a single split 54 therein and each of the opposing ends have end flanges 60 through which machine screw 62 extends to clamp the the opposing ends 60 together.

The preferred embodiment of rotation means 28 is in the form of a ring 64 defined by an external surface 66 and an internal surface 68 rotatably carried upon the central portion 46 of the cylindrical collar 22. A pair of opposed flanges 70A & 70B project laterally from the external surface 66. There are alinged bores 72 in the flanges 70A & 70B which carry a threaded pin 74 and a locking lever 76 is rotatably carried at its end 78 upon the pin 74 permitting the locking lever 76

4 to be moved into a vertical position to enter the lateral opening cavities 58 (see FIG. 2) or a horizontal position (see FIG. 5) clearing the cavities.

In the preferred embodiment of FIG. 5, the ring 64 of the rotation means is bifurcated and the resulting two parts 64A & 64B are hinged together by hinge means 80. In another embodiment shown in FIG. 8, the ring 64A of the rotation means 28A has a split 82 between the pair of opposed flanges 70A & 70B.

A horizontal slot 84 extends through the cylindrical collar 22 from the outside surface 38 to the inside surface 40. A rotation pin 86 having an internal end 88 and an external end 90 by which the pin 86 is carried by the rotation means 28 via the threaded buttress 92. The pin 86 extends horizontally through the horizontal slot 84 inwardly of the cylindrical collar 22 (see FIG. 6).

The arcuate tube 30 with a bottom portion 94 is axially alinged with and rotatably carried in the tubular member 20. The bottom portion 94 contains a lateral hole 95 through which the internal end 88 of the rotation pin 86 extends.

A top portion 96 of tube 30 extends beyond the upper end portion 32 and at an angle relative to the longitudinal axis of the tubular member 20.

Use of the new locking device 2 is easily performed to provide quick and positive movement between preselected position of the outrigger pole 8 as determined by the cavities 58. Thus, with locking means 2 as seen in FIG. 1 installed on the port side of the motorboat carrying T-top 6 and with the locking lever 76 positioned as shown, the outrigger pole 8 would be extending outboard in a trolling position. To bring the pole 8 inboard to a stowage position, the rotation lever 76 would be pulled forward and down to clear the cavity current cavity 58, moved horizontally inboard and then raised into the innermost cavity to be position as shown in phantom in FIG. 1.

The quick selection outrigger systems 2 enable easy readjustment of the preselected positions prescribed by the cvavities 58 relative to a motorboat's longitudinal axis. Thus, by releasing the clamping of the indexing means 24 via manipulation of machine screws 62, the ring member 48 may be moved circumferentially relative to collar 22 to reposition cavities 58 and then tightening of the screws 62 will provide the new selected positions for the outrigger pole 8.

I claim:

1. In an outrigger device installed on a T-top equipped motorboat having an outrigger pole supported by its bottom end portion above said T-top and which permits said outrigger pole to be moved by rotation of said lower end portion from a stowage position to a trolling position and vis versa by a person safely standing in said motorboat in the shelter of said T-top by manipulation of locking means, the improvement in said locking means which comprises:

a tubular member that extends through said T-top is defined by a longitudinal axis, an upper end portion and a lower end portion joined integrally to a central portion, a cylindrical collar axially aligned with said tubular member defined by an outside surface, an inside surface, an upper end, a lower end and an integral central portion, said collar being fixed to said lower end portion of said tubular member, indexing means comprising a ring-like piece having an inner arcuate surface, an outer arcuate surface and at least one split portion therein, compression means to clamp said indexing means in fixed position upon said central portion of said cylindrical collar and to release said indexing means for repositioning thereof circumferentially relative to said cylindrical collar, said indexing means including a plurality of lugs that project laterally from said outer arcuate surface with said lugs defining a plurality of lateral opening cavities, rotation means in the form of a ring defined by an external surface and an internal surface rotatably carried upon said central portion of said cylindrical collar, a pair of opposed flanges that project laterally from said external surface, aligned bores in said flanges, a pin carried in said bores and a locking lever rotatably carried at one end upon said pin permitting said locking lever to be moved into a vertical position to enter said lateral opening cavities or a horizontal position clearing said cavities, a horizontal slot extending through said cylindrical collar from said outside surface to said inside surface having a length substantially less than the circumference of said cylindrical collar, a rotation pin having an internal end and an external end by which said pin is carried by said rotation means extending horizontally through said horizontal slot inwardly of said cylindrical collar, an arcuate tube defined by a bottom portion axially aligned with said longitudinal axis and rotatably carried in said tubular member and a top portion extending beyond said upper end portion and at an angle relative to said longitudinal axis of said tubular member, said bottom portion containing a lateral hole through which said internal end of said rotation pin extends.

2. The outrigger device of claim 1 wherein said ring-like piece of said indexing means is split into two parts, each of which has end flanges through which machine screws extend to clamp said two parts together.

3. The outrigger device of claim 1 wherein said ring-like piece of said indexing means has a single split therein and each of the opposing ends of said ring-like piece has end flanges through which a machine screw extends to clamp said said opposing ends together.

4. The outrigger device of claim 1 wherein said ring of said rotation means is bifurcated and the resulting two parts are hinged together by hinge means located diametrically opposed to said pair of opposed flanges.

5. The outrigger device of claim 1 wherein said ring of said rotation means is split between said pair of opposed flanges.

\* \* \* \* \*